(12) United States Patent
Ernandes et al.

(10) Patent No.: US 10,884,138 B2
(45) Date of Patent: Jan. 5, 2021

(54) SATELLITE AUTOMATIC IDENTIFICATION SYSTEM (AIS) FOR TRACKING A PLURALITY OF MARITIME VESSELS AND RELATED METHODS

(71) Applicant: EAGLE TECHNOLOGY, LLC, Melbourne, FL (US)

(72) Inventors: Kenneth Joseph Ernandes, Melbourne Beach, FL (US); Sean Kevin Freeman, Indialantic, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 238 days.

(21) Appl. No.: 16/014,673

(22) Filed: Jun. 21, 2018

(65) Prior Publication Data

US 2019/0391277 A1    Dec. 26, 2019

(51) Int. Cl.
  *G01S 19/45*    (2010.01)
  *G01S 19/10*    (2010.01)
  *G01S 5/02*     (2010.01)

(52) U.S. Cl.
  CPC ............ *G01S 19/45* (2013.01); *G01S 5/0294* (2013.01); *G01S 19/10* (2013.01)

(58) Field of Classification Search
  CPC .......... G08G 3/00; G01S 5/02; G01S 5/0294; G01S 13/917; G01S 13/9307; G01S 19/46; H04B 7/185; H04B 7/1851; H04B 7/18513
  USPC .......................................................... 342/16
  See application file for complete search history.

(56) References Cited

U.S. PATENT DOCUMENTS

| | | | | |
|---|---|---|---|---|
| 6,085,128 A | * | 7/2000 | Middour | B64G 1/242 701/13 |
| 6,496,778 B1 | * | 12/2002 | Lin | G01S 19/55 701/470 |
| 7,667,642 B1 | * | 2/2010 | Frericks | G01S 19/41 342/357.57 |

(Continued)

OTHER PUBLICATIONS

Nelson et al., Estimation, Tracking and Geolocation of Maritime Burst Signals from a Single Receiver; Conference Paper, May 22, 2015, 11 pages, Proc. SPIE 9476, Automatic Target Recognition XXV, 94760P; doi: 10.117/12.2175828.
Small, Radio Frequency Emitter Geolocation using Cubesats, Thesis, Mar. 2014, 101 pages, AFIT-ENG-14-M-68, Department of the Air Force Air University, Air Force Institute of Technology, Wright-Patterson Air Force Base, Ohio.

(Continued)

*Primary Examiner* — Peter M Bythrow
*Assistant Examiner* — Alexander L. Syrkin
(74) *Attorney, Agent, or Firm* — Allen, Dyer, Doppelt, + Gilchrist, P.A. Attorneys at Law

(57) ABSTRACT

A satellite Automatic Identification System (AIS) for tracking maritime vessels includes a constellation of Low-Earth Orbit (LEO) satellites. Each LEO satellite includes an AIS payload for receiving AIS messages from the maritime vessels and determining therefrom reported vessel position data and satellite-based observation data. The system also includes an AIS reporting system configured to obtain the reported maritime vessel position data and satellite-based observation data from the LEO satellites over time. In addition, the AIS reporting system is configured to filter the reported maritime vessel position data and satellite-based observation data to recursively produce estimated maritime vessel positions and update the estimated maritime vessel positions for the maritime vessels.

27 Claims, 5 Drawing Sheets

(56) References Cited

U.S. PATENT DOCUMENTS

| | | | | |
|---|---|---|---|---|
| 7,817,079 | B1* | 10/2010 | Funk | G01S 13/917 |
| | | | | 342/41 |
| 8,831,906 | B1* | 9/2014 | Alon | G01S 13/58 |
| | | | | 702/150 |
| 8,874,398 | B2* | 10/2014 | Raghupathy | G01S 5/021 |
| | | | | 702/94 |
| 9,110,157 | B2* | 8/2015 | Levin | G01S 19/12 |
| 9,176,217 | B2* | 11/2015 | Krasner | G01S 1/24 |
| 9,726,499 | B2* | 8/2017 | Coatantiec | G01C 21/165 |
| 9,733,363 | B2* | 8/2017 | Dahan | G01S 19/43 |
| 9,842,504 | B2 | 12/2017 | Short et al. | |
| 9,880,286 | B2* | 1/2018 | Rudow | G01S 19/48 |
| 9,933,527 | B2* | 4/2018 | MacGougan | G01S 19/52 |
| 10,082,580 | B2* | 9/2018 | Ben-Moshe | G01S 19/215 |
| 2008/0059059 | A1* | 3/2008 | Cohen | G01S 19/02 |
| | | | | 701/408 |
| 2008/0062039 | A1* | 3/2008 | Cohen | G01S 19/29 |
| | | | | 342/357.29 |
| 2014/0218242 | A1 | 8/2014 | Platzer | |
| 2015/0304634 | A1* | 10/2015 | Karvounis | G06K 9/00201 |
| | | | | 348/46 |
| 2017/0102466 | A1* | 4/2017 | Petkus | G01S 5/06 |
| 2018/0123680 | A1* | 5/2018 | Stolte | H04B 7/18513 |
| 2018/0231669 | A1* | 8/2018 | Stastny | G01C 21/203 |
| 2019/0033463 | A1* | 1/2019 | Ben-Moshe | G01S 19/21 |

OTHER PUBLICATIONS

Nelson et al., Target Location from the Estimated Instantaneous Received Frequency, Conference Paper, May 25, 2011, 8 pages, Proc. SPIE 8020, Airborne Intelligence, Surveillance, Reconnaissance (ISR) Systems and Applications VIII, 80200Q; doi: 10.1117/12.884559.

Faragher et al., Spoofing Mitigation, Robust Collision Avoidance, and Opportunistic Receiver Localisation Using a New Signal Processing Scheme for ADS-B or AIS, 11 pages, Sep. 2014, Proceedings of the 27th International Technical Meeting of the Satellite Division of the Institute of Navigation (ION GNSS+ 2014).

Cajacob et al., Geolocation of RF Emitters with a Formation-Flying Cluster of Three Microsatellites, 13 pages, Aug. 2016, 30th Annual AIAA/USU Conference on Small Satellites.

Douglas et al., Moderating Argos Location Errors in Animal Tracking Data, 9 pages, Oct. 2012, Methods in Ecology and Evolution, British Ecological Society.

Guo, Space-Based Detection of Spoofing AIS Signals Using Doppler Frequency, Multisensor, Multisource Information Fusion: Architectures, Algorithms, and Applications, 2014, 6 pages; Proc. of SPIE vol. 9121.

Witzgall et al., Doppler Geolocation with Drifting Carrier, The 2011 Military Communications Conference—Track 1—Waveforms and Signal Processing, 6 pages, 2011 IEEE.

* cited by examiner

SATELLITE AUTOMATIC IDENTIFICATION SYSTEM (AIS) FOR TRACKING A PLURALITY OF MARITIME VESSELS AND RELATED METHODS

TECHNICAL FIELD

The present invention relates to the field of identification systems, and, more particularly, to a satellite-based Automatic Identification System (AIS) for tracking a plurality of maritime vessels and related methods.

BACKGROUND

While AIS was originally employed to provide collision avoidance for maritime vessels, its application has been extended into maritime surveillance using terrestrial and space-borne receivers. The AIS system, however, is a self-monitored reporting system and misreporting occurs from equipment failures or deliberately by "bad actors." These "bad actors" may use a number of techniques to "spoof" the reported AIS data to avoid detection from authorities, which may endanger other marine vessels by not correctly reporting their position. Further, localized global positioning system (GPS) jamming could result in significant misreporting because AIS uses a vessel's GPS to report its position, and thus, reporting incorrect GPS coordinates by the AIS endangers all maritime vessels in a jammed area.

In addition, there are any number of vessels that may be inadvertently or deliberately misreporting. For example, vessels may be "Zero MMSI", meaning that they do not have a registered device. Alternatively, vessels may report the same Maritime Mobile Service Identity (MMSI) as other vessels, which may occur when the MMSI is "pirated" or possibly obtained from used equipment. This is often a result of MMSI assignment to a device being permanent or difficult to change as required by the FCC. Also, some vessels may lack GPS information reporting capability because of a broken GPS, GPS interface, or the GPS was disconnected, for example. Some vessels may configure their AIS to "flip" the sign of latitude and/or longitude data when reporting to avoid detection. There may be (or soon may be) more refined methods to manipulate the AIS reporting data such as offsetting or walking location reporting, for example.

Various approaches have been developed for validating AIS reporting data. One such approach is set forth in U.S. Patent Application No. 2018/0123680 to Stolte et al. As the AIS data is received, the data is tagged with a measured frequency offset from a nominal frequency and a time delay to determine actual signal propagation delay. An expected frequency and time offsets based upon a position report and latest satellite ephemeris are then calculated to determine an expected signal propagation delay. If a comparison of the measured signal propagation delay to the expected signal propagation delay exceeds a threshold, then the AIS data is flagged as suspect.

Despite the advantages provided by such systems, further improvements may be desirable for more efficient and accurate validation of AIS data.

SUMMARY

A satellite Automatic Identification System (AIS) for tracking maritime vessels may include a constellation of Low-Earth Orbit (LEO) satellites. Each LEO satellite includes an AIS payload for receiving AIS messages from the maritime vessels, and determining therefrom reported vessel position data and satellite-based observation data. The system may also include an AIS reporting system configured to obtain the reported maritime vessel position data and satellite-based observation data from the LEO satellites over time. In addition, the AIS reporting system may be configured to filter the reported maritime vessel position data and satellite-based observation data to recursively produce estimated maritime vessel positions and update the estimated maritime vessel positions for the maritime vessels.

The AIS reporting system may be configured to filter the reported maritime vessel position data and satellite-based observation data obtained over time using a Kalman filter. The AIS reporting system may also be configured to filter the reported maritime vessel position data and satellite-based observation data recursively produce estimated maritime vessel speeds and headings and to update the estimated maritime vessel speeds and headings for the plurality of maritime vessels.

The AIS reporting system may also be configured to filter the reported maritime vessel position data and satellite-based observation data obtained over time along with associated uncertainties, and refine the estimated maritime vessel positions using respective weighting values based upon the associated uncertainties.

The AIS reporting system may be configured to identify a position misreporting maritime vessel based upon the updated estimated maritime vessel positions for the plurality of maritime vessels. The AIS reporting system may also be configured to assign a unique identification to an identification misreporting maritime vessel.

For embodiments where the reported maritime vessel position data is based upon GPS, and the AIS reporting system may be configured to determine a plurality of position misreporting maritime vessels in a geographic area indicative of GPS signal jamming.

In addition, the AIS reporting system may be configured to obtain the reported maritime vessel position data and satellite-based observation data from a plurality of LEO satellites of the constellation of LEO satellites.

The system may include a tracking database, and the AIS reporting system may be configured to store the updated estimated maritime vessel positions for the plurality of maritime vessels in the tracking database and selectively provide access thereto. The satellite-based observation data may include at least one of Doppler shift data, time-of-arrival data, and time-difference-of-arrival data.

In another aspect, a method for tracking a plurality of maritime vessels in cooperation with a constellation of LEO satellites is disclosed. Each LEO satellite includes an Automatic Identification System (AIS) payload for receiving AIS messages from the plurality of maritime vessels and determining therefrom reported vessel position data and satellite-based observation data. The method may include operating an AIS processor and memory cooperating therewith to obtain the reported maritime vessel position data and satellite-based observation data from the constellation of LEO satellites over time. In addition, the method may include operating the processor to filter the reported maritime vessel position data and satellite-based observation data obtained over time, to recursively produce estimated maritime vessel positions, and to update the estimated maritime vessel positions for the plurality of maritime vessels.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present embodiments take a global view of the vessel position awareness and verification problem. The present embodiments define a data-driven data fusion and distribution system that may provide continuous validation of the vessel reports of the tens of thousands of vessels around the Earth.

Figure 1:
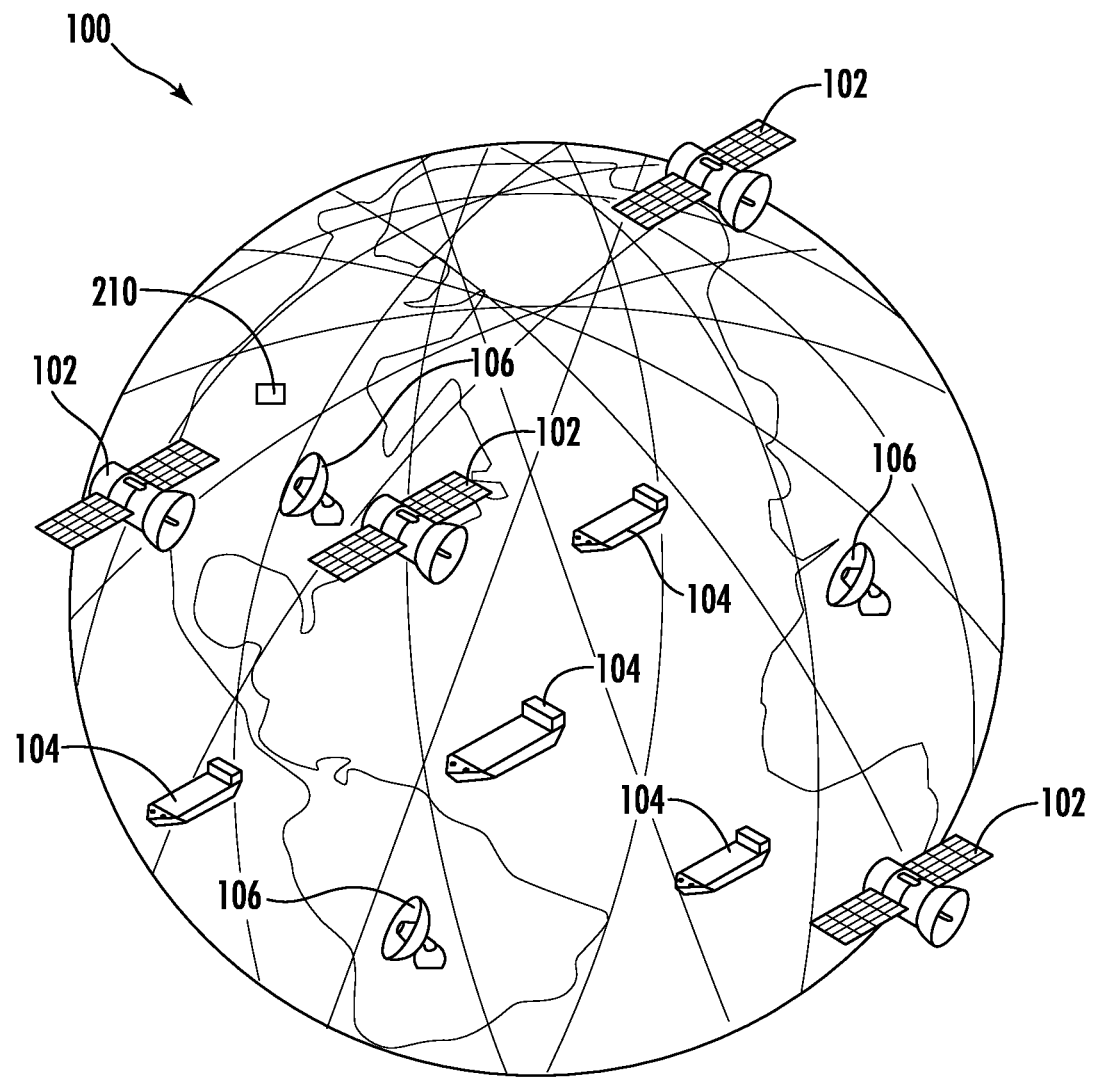
FIG. 1 is a schematic diagram of an exemplary satellite Automatic Identification System (AIS) for tracking a plurality of maritime vessels in accordance with the invention.
Figure 2:
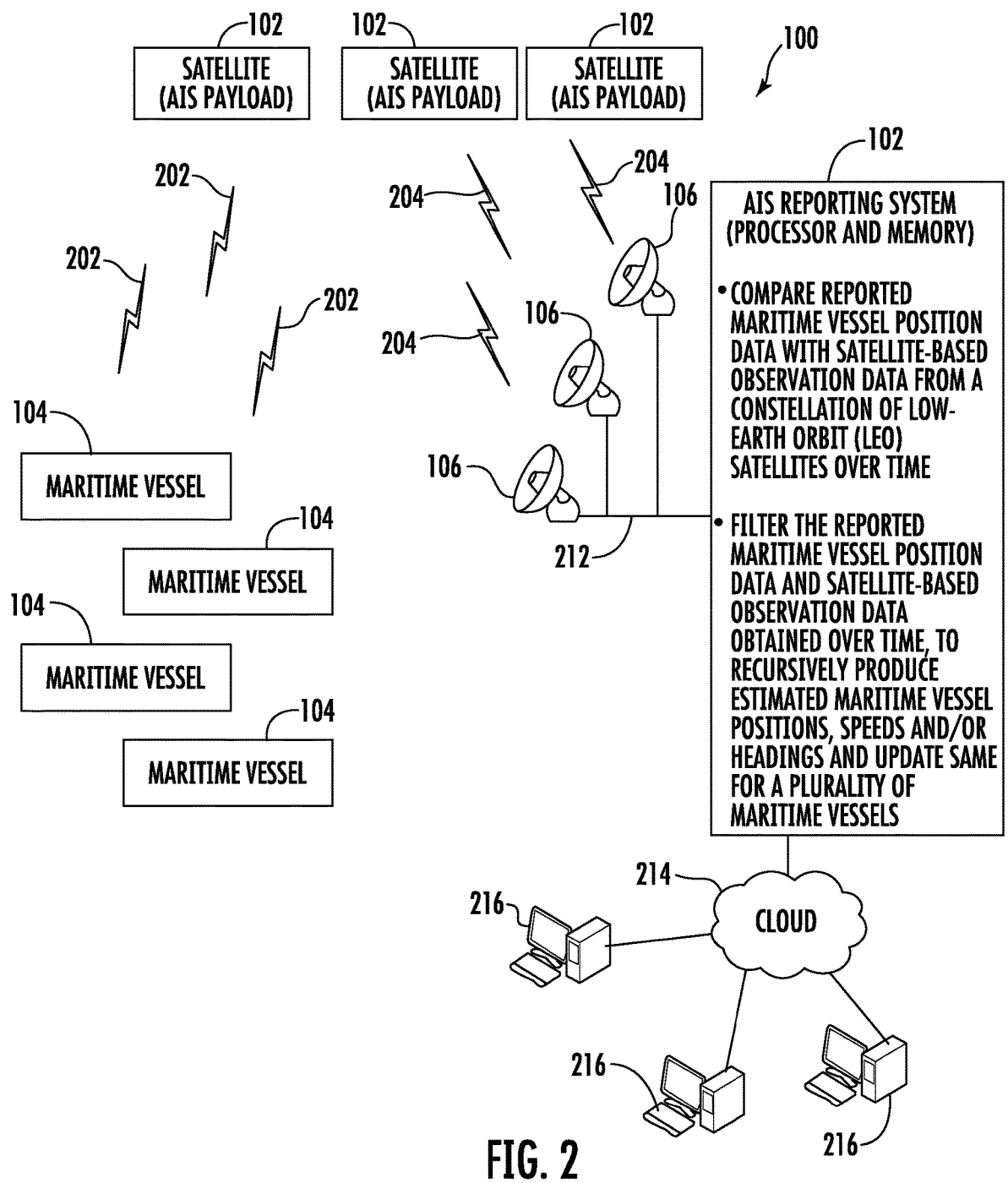
FIG. 2 is a schematic block diagram illustrating an exemplary embodiment of the satellite AIS system of FIG. 1 in greater detail.

Referring initially to FIGS. 1 and 2, a satellite Automatic Identification System (AIS) 100 for tracking a plurality of maritime vessels 104 is described. In particular, the system 100 illustratively includes a constellation of Low-Earth Orbit (LEO) satellites 102. For example, the LEO satellite constellation may be the Iridium NEXT constellation. Each LEO satellite 102 includes an AIS payload for receiving AIS messages from the maritime vessels 104 and for determining therefrom reported vessel position data and satellite-based observation data. Maritime vessel speeds and headings may also be used.

The system 100 also includes an AIS reporting system 210 configured to obtain the reported maritime vessel position data and satellite-based observation data from the LEO satellites 102 over time. The AIS reporting system 210 illustratively includes a processor and a memory coupled thereto. In addition, the AIS reporting system 210 is configured to filter the reported maritime vessel position data and satellite-based observation data to recursively produce estimated maritime vessel positions (speeds, headings) and update the estimated maritime vessel positions (speeds, headings) for the maritime vessels 104.

In operation, the maritime vessels 104 may transmit their identity, position data, heading, speed, and other pertinent information (i.e., AIS message content) to the LEO satellites 102 orbiting the earth. The transmissions 202 are decoded by at least one LEO satellite 102 that receives the transmissions 202. In turn, this decoded information and satellite-based observation data is sent by transmissions 204 to ground stations 106. The ground stations 106 are in communication with the AIS reporting system 210 via network 212, which processes both the vessel data and satellite-based observation data to validate reported positions of the respective maritime vessels 104 to generate position validation (PV) data. The PV data is accessible via the Cloud 214 or other network to users 216.

Figure 4:
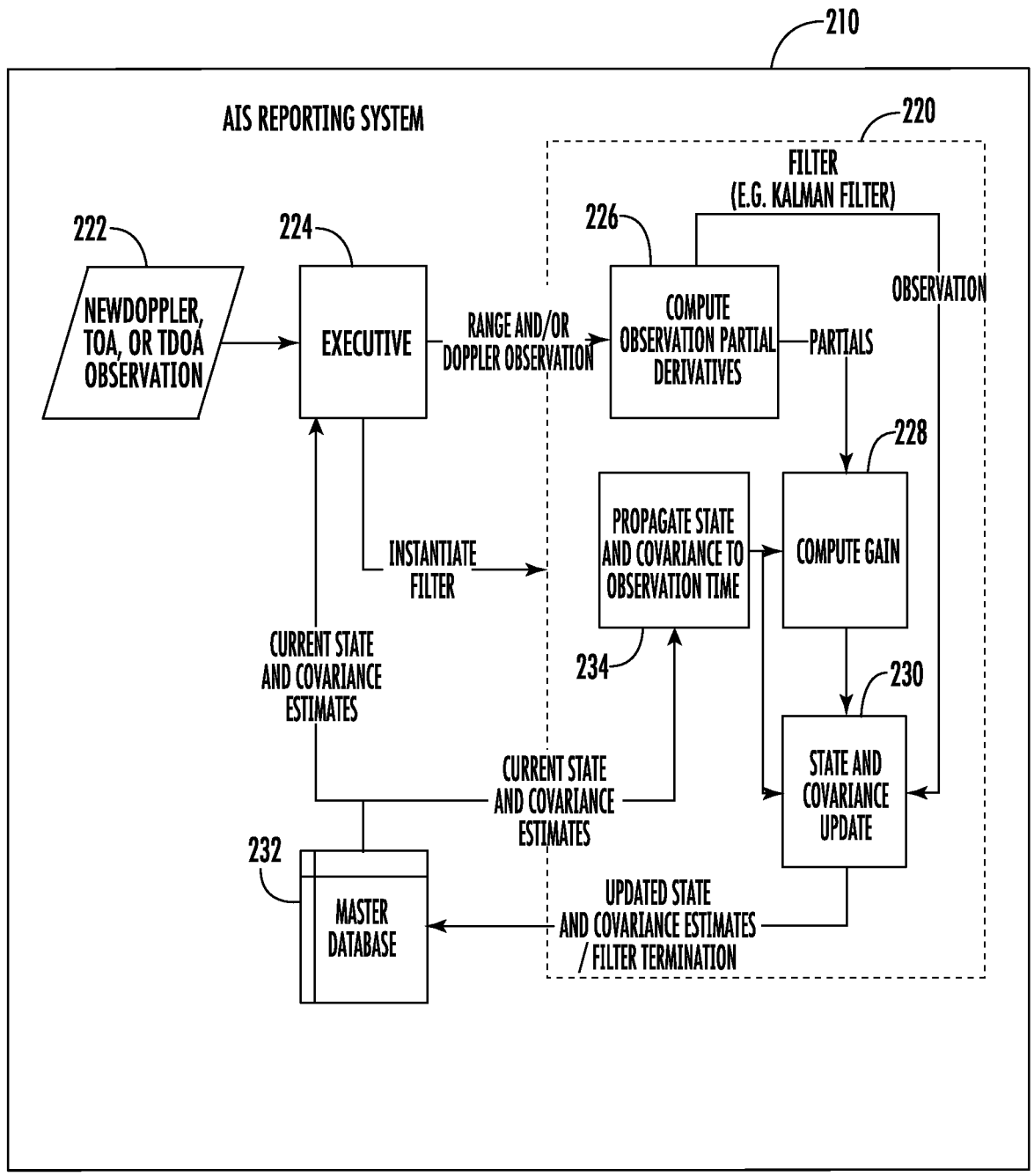
FIG. 4 is a schematic block diagram of the AIS reporting system as shown in FIG. 2.

With additional reference to FIG. 4, the system 100 is configured to specifically combine different types of data, as available, via a (sequential) filter 220 of the AIS reporting system 210 that compares the consistency of reported position and state vector data from the AIS message content with the satellite-based observations of the vessel's intercepted AIS radio transmissions 202. The filter 220 (such as a Kalman filter) maintains an estimated position and motion state, along with statistical assessments, to provide continuous surveillance.

Maritime vessels 104 with a high level of correlation between the AIS message content and the satellite-based observations are flagged as a low level of concern and may be monitored at lower rate while maritime vessels 104 with either no reported positional data or reports inconsistent with the satellite-based observations may be given higher priority of attention and processing.

The types of satellite-based observation data processed in the filter 220 may include (1) received AIS message Doppler frequency shift, (2) message time of arrival (TOA) from transmission (for ranging), and (3) time and/or frequency difference of arrival (TDOA/FDOA) for interferometric observations when multiple observations are obtained from different receivers in the constellation of LEO satellites 102. The known tolerances and uncertainties in the various measurements are used in the filter 220 in a statistically rigorous fashion to apportion weighting for updates to the state vector (SV) estimates (or tracks).

The use of complementary satellite-based observation types of data provides an inherent ambiguity resolution capability. Although an individual satellite-based observation has a symmetric ambiguity, for the majority of AIS reports (for correctly functioning AIS transceivers) will show the reported position and velocity will lie within the Doppler hyperbolic band, providing confidence that the report is accurate to a certainty that varies as a function of range-rate from the observing platform. If TOA (Range) and Doppler are both available from a single satellite-based observation the uncertainty is further reduced to an ellipse.

As the AIS signal receiver payloads are hosted in a LEO constellation with sets of satellites 102 in inertially coplanar orbits, additional ambiguity resolution is accomplished in a number of ways.

For example, when observations are made in tandem between two or more satellites 102 in the same plane, the ambiguity is resolved by the Earth rotational shift over the relatively short time difference between the successive observations. While the symmetry from a single satellite's observations is apparent, the addition of observations from one or more subsequent satellites shifted in ground track allows a solution set to be in clear agreement. This agreement is inherently exploited by the mathematics of the filter 220, such that a single subsequent observation (or set of observations) by the next observing satellite refines the solution, without the need to re-process previous observations. The data already stored in the database from the previous update is a sufficient basis to update the track, processing only the new observations. Similarly, when observations are made by satellites from adjacent planes, the ambiguities are readily resolved using TDOA/FDOA techniques as can be appreciated by those of ordinary skill in the art.

The present embodiments may also address each of the known "Misreporting" types. For example, in the case of "Zero MMSI" or "Reused MMSI" reports, the system 100 is configured to assign a unique identifier to each track using the spatial filtering of the combined report and observation for track association. In response to "181/91" transmissions, which represent an impossible coordinate set of 181 degrees longitude/91 degrees latitude, the system 100 is configured to use the spatial filtering inherent in the processing engine when the GPS attached to the AIS receiver is not connected or not functioning. "Flippers", which refers to vessels that reverse the (+/−) numeric sign on the longitude and latitude coordinates to obscure their position, are readily discriminated by sequential filtering of the reports using the system 100. GPS jamming, which generates a number of misreporting transceivers in a geographic region is readily identified by the system 100 and would be a valuable cautionary report for all maritime vessels 104.

Figure 3:
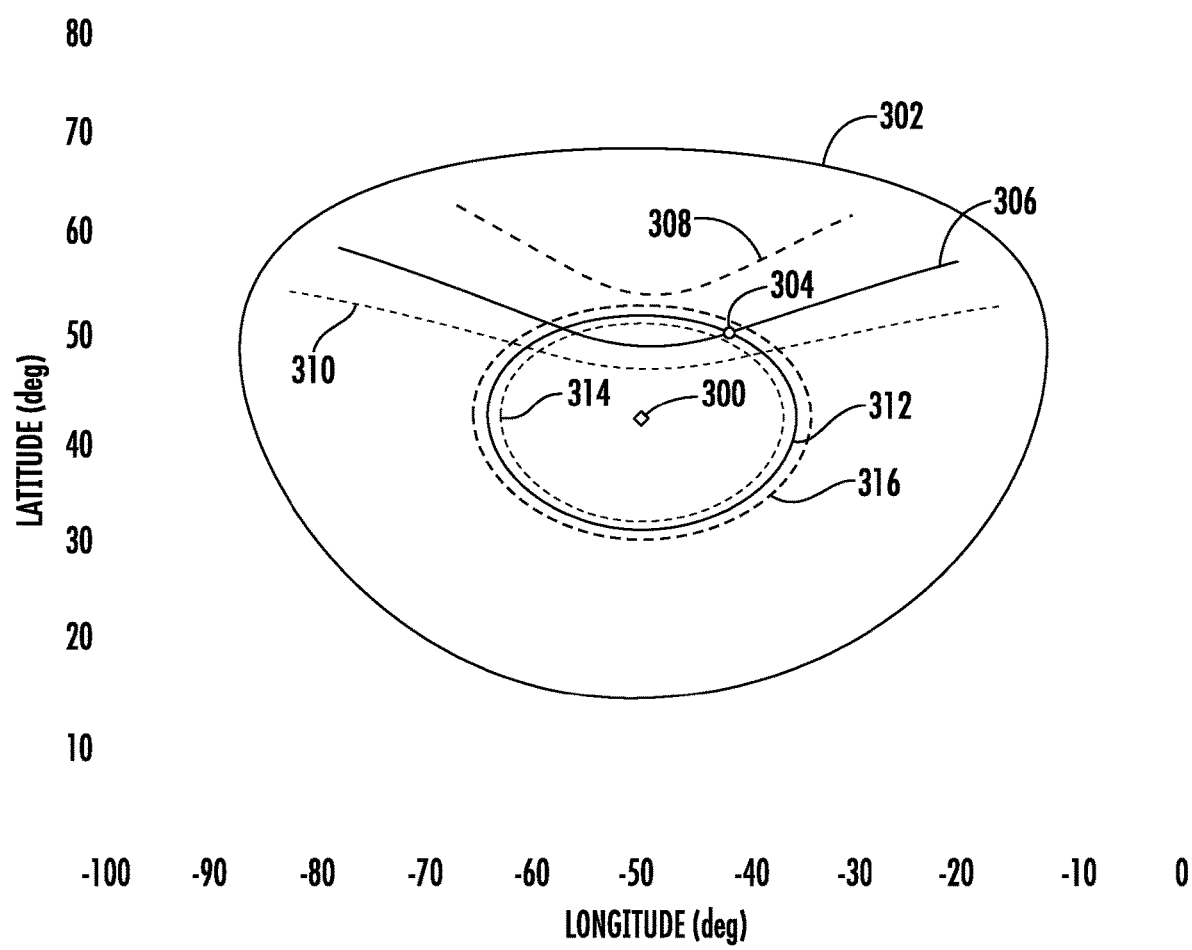
FIG. 3 is a chart of exemplary Doppler bands and time of arrival (TOA) ranges plotted in accordance with the invention.

Referring now to FIG. 3, an example of position anomaly detection is now described. For example, at the center is a satellite 300 with its footprint 302 plotted on a latitude and longitude axes. The maritime vessel's reported position is indicated at 304.

The two basic elements of satellite-based observations used to generate the PV data are Doppler and Time of Arrival (TOA). These two basic elements can be used to make an initial assessment of the accuracy of intercepted AIS message content. For example, a Doppler band representing 500 Hz 308 and a Doppler band representing −500 Hz 310 are plotted in FIG. 3, with a line of bearing (LOB) 306 therebetween. In addition, ranges of TOA are also plotted with a 94 km range 316 and a −94 km range 314 with a line of position (LOP) 312 therebetween.

If TOA information is not available, the AIS reporting system 210 is configured to calculate as if the reported position and velocity was within the Doppler band and/or computes a level of confidence in the reported position. This single-intercept assessment will likely be sufficient for the majority of the tens of thousands of intercepted AIS messages. Maritime vessels 104 whose data does not comport with the Doppler and/or TOA calculations are flagged for additional processing by the AIS reporting system 210.

The present embodiments provide a global capability with up-to-date awareness and tracking status information available for dissemination as it is collected. The database-driven approach of the AIS reporting system 210 separates the data collection and dissemination segment from the computational segment (i.e., filter 220). The AIS reporting system 210 is configured to filter the reported maritime vessel position data and satellite-based observation data obtained over time along with associated uncertainties, and update the estimated maritime vessel positions using respective weighting values based upon the associated uncertainties.

For example, referring again to FIG. 4, new Doppler, TOA or TDOA observation data is collected at Block 222. That observation data is provided to the executive module 224, which is configured to manage data inputs, outputs, and database interactions as well as computational update rates. The executive module 224 provides range and/or Doppler satellite-based observations to the filter 220 for processing. Partial derivative computations from the satellite-based range and/or Doppler satellite-based observations, at Block 226, are used to compute gain, at Block 228. The state and covariance estimates are updated at Block 230, using observation data and with input from state and covariance estimates propagated to observation time, at Block 234. The updated state and covariance estimates are then stored in a database 232 as the current state and covariance estimates (or tracks).

Due to its sequential nature, the computational update estimation filter 220 persists for the brief time a processing update occurs as new data is collected. The parameters used to resume computation are read from the database 232 and are the current awareness parameters, allowing the filter 220 to make the next update in the same manner as though the filter 220 persisted indefinitely. This approach allows a single or small finite number of filters to be running at any given time, with the same effect as though parallel unique filters were running for all maritime vessels 104 all the time. Thus, global awareness is constantly maintained by a relatively small computational array.

Because the database 232 is managed separately, inquiries on any maritime vessel 104 may be made at any given time, with assurance that the information represents that which is most currently available. Thus, observational data is processed at receipt time, with an efficient update that is saved to the database 232 in a manner that automatically creates a setup for a new estimation update the next time more observations are received. Estimation filters are created and persist only for the time needed to process the new data.

Figure 5:
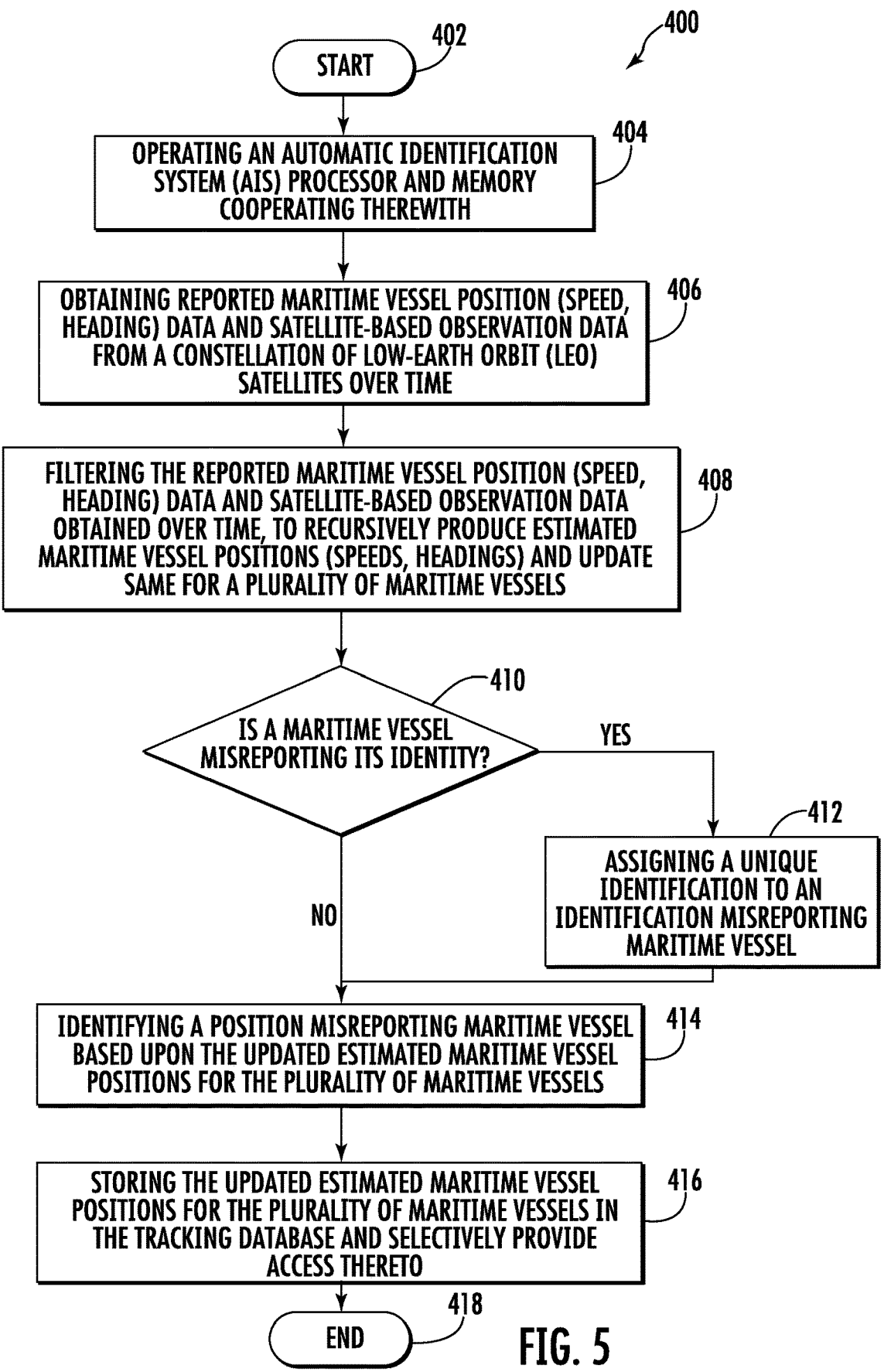
FIG. 5 is a flow diagram illustrating method aspects associated with the system of FIG. 1.

Referring now to the flowchart 400 of FIG. 5, a method for tracking a plurality of maritime vessels in cooperation with a constellation of LEO satellites is now described. Each LEO satellite includes an Automatic Identification System (AIS) payload for receiving AIS messages from the plurality of maritime vessels and determining therefrom reported vessel position data and satellite-based observation data.

After the start (Block 402), the method includes, at Block 404, operating an AIS processor and memory cooperating therewith to obtain, at Block 406, the reported maritime vessel position data and satellite-based observation data from the constellation of LEO satellites over time. In addition, the method includes, at Block 408, to filter the reported maritime vessel position data (speed, heading) and satellite-based observation data obtained over time, to recursively produce estimated maritime vessel positions (speeds, headings), and to update the estimated maritime vessel positions (speeds, headings) for the plurality of maritime vessels. Moving to Block 410, if a maritime vessel is misreporting its identity, an identification is assigned to the misreporting maritime vessel, at Block 412. In addition, the method includes identifying a position misreporting maritime vessel, at Block 414, based upon the updated estimated maritime vessel positions (speeds, headings) for the plurality of maritime vessels. The method also includes storing, at Block 416, the updated estimated maritime vessel positions (speeds, headings) for the plurality of maritime vessels in the tracking database and selectively provide access thereto, before stopping at Block 418.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A satellite Automatic Identification System (AIS) for tracking a plurality of maritime vessels, the AIS comprising:
   a constellation of Low-Earth Orbit (LEO) satellites, each LEO satellite comprising an AIS payload for receiving AIS messages from the plurality of maritime vessels and determining therefrom reported vessel position data and satellite-based observation data; and
   an AIS reporting system configured to
     obtain the reported maritime vessel position data and satellite-based observation data from said constellation of LEO satellites over time, and filter the reported maritime vessel position data and satellite-based observation data obtained over time along with associated uncertainties by updating state and covariance estimates using the reported maritime vessel position data and satellite-based observation data with input from state and covariance estimates propagated to a time of observation, to recursively produce estimated maritime vessel positions and update the estimated maritime vessel positions for the plurality of maritime vessels using respective weighting values based upon the associated uncertainties.

2. The satellite AIS according to claim 1 wherein the AIS reporting system is configured to filter the reported maritime vessel position data and satellite-based observation data obtained over time using a Kalman filter.

3. The satellite AIS according to claim 1 wherein the AIS reporting system is configured to filter the reported maritime vessel position data and satellite-based observation data obtained over time, to recursively produce estimated maritime vessel speeds and headings and update the estimated maritime vessel speeds and headings for the plurality of maritime vessels.

4. The satellite AIS according to claim 1 wherein said AIS reporting system is configured to identify a position misreporting maritime vessel based upon the updated estimated maritime vessel positions for the plurality of maritime vessels.

5. The satellite AIS according to claim 1 wherein said AIS reporting system is configured to assign a unique identification to an identification misreporting maritime vessel.

6. The satellite AIS according to claim 1 wherein the reported maritime vessel position data is based upon a Global Position System (GPS); and wherein said AIS reporting system is configured to determine a plurality of position misreporting maritime vessels in a geographic area indicative of GPS signal jamming.

7. The satellite AIS according to claim 1 wherein said AIS reporting system is configured to obtain the reported maritime vessel position data and satellite-based observation data from a plurality of LEO satellites of said constellation of LEO satellites.

8. The satellite AIS according to claim 1 comprising a tracking database; and wherein said AIS reporting system is configured to store the updated estimated maritime vessel positions for the plurality of maritime vessels in the tracking database and selectively provide access thereto.

9. The satellite AIS according to claim 1 wherein the satellite-based observation data comprises at least one of Doppler shift data, time-of-arrival data, and time-difference-of-arrival data.

10. An Automatic Identification System (AIS) reporting system for tracking a plurality of maritime vessels in cooperation with a constellation of Low-Earth Orbit (LEO) satellites, each LEO satellite comprising an AIS payload for receiving AIS messages from the plurality of maritime vessels and determining therefrom reported vessel position data and satellite-based observation data, the AIS reporting system comprising:

an AIS processor and memory cooperating therewith and configured to obtain the reported maritime vessel position data and satellite-based observation data from the constellation of LEO satellites over time, and filter the reported maritime vessel position data and satellite-based observation data obtained over time along with associated uncertainties, by updating state and covariance estimates using the reported maritime vessel position data and satellite-based observation data with input from state and covariance estimates propagated to a time of observation to recursively produce estimated maritime vessel positions and update the estimated maritime vessel positions for the plurality of maritime vessels using respective weighting values based upon the associated uncertainties.

11. The AIS reporting system according to claim 10 wherein the AIS processor is configured to filter the reported maritime vessel position data and satellite-based observation data obtained over time using a Kalman filter.

12. The AIS reporting system according to claim 10 wherein the AIS processor is configured to filter the reported maritime vessel position data and satellite-based observation data obtained over time, to recursively produce estimated maritime vessel speeds and headings and update the estimated maritime vessel speeds and headings for the plurality of maritime vessels.

13. The AIS reporting system according to claim 10 wherein said AIS processor is configured to identify a position misreporting maritime vessel based upon the updated estimated maritime vessel positions for the plurality of maritime vessels.

14. The AIS reporting system according to claim 10 wherein said AIS processor is configured to assign a unique identification to an identification misreporting maritime vessel.

15. The AIS reporting system according to claim 10 wherein the reported maritime vessel position data is based upon a Global Positioning System (GPS); and wherein said AIS processor is configured to determine a plurality of position misreporting maritime vessels in a geographic area indicative of GPS signal jamming.

16. The AIS reporting system according to claim 10 wherein said AIS processor is configured to obtain the reported maritime vessel position data and satellite-based observation data from a plurality of LEO satellites of the constellation of LEO satellites.

17. The AIS reporting system according to claim 10 wherein said memory stores a tracking database therein; and wherein said AIS processor is configured to store the updated estimated maritime vessel positions for the plurality of maritime vessels in the tracking database and selectively provide access thereto.

18. The AIS reporting system according to claim 10 wherein the satellite-based observation data comprises at least one of Doppler shift data, time-of-arrival data, and time-difference-of-arrival data.

19. A method for tracking a plurality of maritime vessels in cooperation with a constellation of Low-Earth Orbit (LEO) satellites, each LEO satellite comprising an Automatic Identification System (AIS) payload for receiving AIS messages from the plurality of maritime vessels and determining therefrom reported vessel position data and satellite-based observation data, the method comprising:

operating an AIS processor and memory cooperating therewith to obtain the reported maritime vessel position data and satellite-based observation data from said constellation of LEO satellites over time, and filter the reported maritime vessel position data and satellite-based observation data obtained over time along with associated uncertainties, by updating state and covariance estimates using the reported maritime vessel position data and satellite-based observation data with input from state and covariance estimates propagated to a time of observation to recursively produce estimated maritime vessel positions and update the estimated maritime vessel positions for the plurality of maritime vessels using respective weighting values based upon the associated uncertainties.

20. The method according to claim 19 comprising operating the AIS processor to filter the reported maritime vessel position data and satellite-based observation data obtained over time using a Kalman filter.

21. The method according to claim 19 comprising operating the AIS processor to filter the reported maritime vessel position data and satellite-based observation data obtained over time, to recursively produce estimated maritime vessel speeds and headings and update the estimated maritime vessel speeds and headings for the plurality of maritime vessels.

22. The method according to claim 19 comprising operating the AIS processor to identify a position misreporting maritime vessel based upon the updated estimated maritime vessel positions for the plurality of maritime vessels.

23. The method according to claim 19 comprising operating the AIS processor to assign a unique identification to an identification misreporting maritime vessel.

24. The method according to claim 19 wherein the reported maritime vessel position data is based upon a Global Positioning System (GPS); and comprising operating the AIS processor to determine a plurality of position misreporting maritime vessels in a geographic area indicative of GPS signal jamming.

25. The method according to claim 19 comprising operating the AIS processor to obtain the reported maritime vessel position data and satellite-based observation data from a plurality of LEO satellites of the constellation of LEO satellites.

26. The method according to claim 19 comprising operating the memory to store a tracking database therein; and comprising operating the AIS processor to store the updated estimated maritime vessel positions for the plurality of maritime vessels in the tracking database and selectively provide access thereto.

27. The method according to claim 19 wherein the satellite-based observation data comprises at least one of Doppler shift data, time-of-arrival data, and time-difference-of-arrival data.

* * * * *